(12) United States Patent
Takagi et al.

(10) Patent No.: US 8,225,601 B2
(45) Date of Patent: Jul. 24, 2012

(54) EXHAUST GAS PURIFICATION SYSTEM FOR INTERNAL COMBUSTION ENGINE

(75) Inventors: Nobuyuki Takagi, Susono (JP); Masahide Miura, Susono (JP); Shinichi Matsumoto, Aichi-ken (JP); Toshitaka Tanabe, Aichi-ken (JP); Yasutaka Nagai, Aichi-ken (JP); Miho Hatanaka, Aichi-ken (JP); Kazuhiko Dohmae, Nissin (JP); Toshio Yamamoto, Aichi-ken (JP); Yasuo Ikeda, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 612 days.

(21) Appl. No.: 12/295,369

(22) PCT Filed: Mar. 29, 2007

(86) PCT No.: PCT/IB2007/000988
§ 371 (c)(1), (2), (4) Date: Jan. 2, 2009

(87) PCT Pub. No.: WO2007/113677
PCT Pub. Date: Oct. 11, 2007

(65) Prior Publication Data
US 2009/0104088 A1    Apr. 23, 2009

(30) Foreign Application Priority Data
Mar. 30, 2006   (JP) .................................. 2006-094897

(51) Int. Cl.
*F01N 3/00* (2006.01)

(52) U.S. Cl. ................ 60/289; 60/276; 60/277; 60/295; 60/297; 60/301

(58) Field of Classification Search ............ 60/276, 60/277, 289, 290, 299, 301
See application file for complete search history.

(56) References Cited

U.S. PATENT DOCUMENTS

| | | | | |
|---|---|---|---|---|
| 5,426,934 A | * | 6/1995 | Hunt et al. ...................... | 60/276 |
| 5,577,383 A | * | 11/1996 | Kuroda et al. .................. | 60/284 |
| 5,878,567 A | * | 3/1999 | Adamczyk et al. ............. | 60/274 |
| 6,722,125 B1 | * | 4/2004 | Pfalzgraf ......................... | 60/295 |
| 7,448,204 B2 | * | 11/2008 | Nishimura et al. ............. | 60/284 |

FOREIGN PATENT DOCUMENTS

| | | |
|---|---|---|
| EP | 0 723 805 A2 | 7/1996 |
| JP | 9-75755 | 3/1997 |
| JP | 2000-87736 | 3/2000 |

(Continued)

OTHER PUBLICATIONS

N. Takagi et al., "Sintering Mechanism of Platinum Supported on Ceria-based Oxide for Automotive Catalysts," SAE International, 2006-01-0413 (2005).
Japanese Office Action issued on Jun. 2, 2009 in Japanese Application No. JP2006-094897.

*Primary Examiner* — Thomas Denion
*Assistant Examiner* — Diem Tran
(74) *Attorney, Agent, or Firm* — Finnegan, Henderson, Farabow, Garrett & Dunner, LLP

(57) ABSTRACT

An exhaust gas purification system includes: a catalyst (3) provided in an exhaust gas passage of an internal combustion engine (1) and having a carrier containing a basic oxide and platinum carried on the carrier; a catalyst (4) for purifying NOx; and oxygen supply means (2).

11 Claims, 2 Drawing Sheets

FOREIGN PATENT DOCUMENTS

| | | |
|---|---|---|
| JP | 2000-202309 | 7/2000 |
| JP | 2003-74334 | 3/2003 |
| JP | 2004-28049 | 1/2004 |
| JP | 2004-028049 * | 1/2004 |
| WO | WO 2004/079170 A1 | 9/2004 |

* cited by examiner

EXHAUST GAS PURIFICATION SYSTEM FOR INTERNAL COMBUSTION ENGINE

CROSS-REFERENCE TO RELATED APPLICATIONS

This application is a national phase application of International Application No. PCT/IB2007/000988, filed Mar. 29, 2007, and claims the priority of Japanese Application No. 2006-094897, filed Mar. 30, 2006, the contents of both of which are incorporated herein by reference.

BACKGROUND OF THE INVENTION

1. Field of the Invention

The present invention relates to an exhaust gas purification system including a catalyst that is provided in an exhaust gas passage of an internal combustion engine and that can be regenerated by redispersing platinum particles having been sintered.

2. Description of the Related Art

In automobiles, an exhaust gas purifying catalyst is used to remove pollutants, such as HC, CO and NOx, contained in an exhaust gas from an engine. A known example of such an exhaust gas purifying catalyst is a three-way catalyst that simultaneously removes HC, CO and NOx from the exhaust gas after combustion at a theoretical air-fuel ratio. The three-way catalyst includes a honeycombed carrier base made of, for example, cordierite or a metal foil, a catalyst-carrying layer made of, for example, active alumina powders or silica powders and coated on the surface of the carrier base, and a precious metal such as platinum carried on the catalyst-carrying layer. The three-way catalyst removes HC and CO in the exhaust gas by oxidation, and reduces NOx.

An oxidation catalyst is also known, in which a precious metal is carried on a catalyst-carrying layer made of zeolite, which has excellent in absorption characteristics for HC contained in the exhaust gas. In the oxidation catalyst, HC contained in the exhaust gas is absorbed by the catalyst-carrying layer at low temperatures, and is released as the temperature of the catalyst increases. The released HC is oxidized by the precious metal when the precious metal is at or above its active temperature. In this way, HC emission can be suppressed at low temperatures, for example, when starting the engine and during in winter.

In addition, to mitigate variations in atmosphere of the exhaust gas, a catalyst having oxygen storage/releasing capacity and an NOx storage reduction catalyst are known. In the former, an element such as ceria is carried on a catalyst-carrying layer. In the latter, an NOx storage material such as alkali metals and alkali earth metals is carried on a catalyst-carrying layer, along with a precious metal.

For the precious metal for use as an active component of such catalysts, platinum (Pt) is primarily used. When platinum is exposed to an oxidizing atmosphere at a high temperature for a long time, however, platinum particles become flocculated (platinum particles grow) and thus platinum sinters, unfavorably reducing the specific surface area of the platinum particles and hence the activity of the catalyst. Thus, various methods have been developed to regenerate exhaust gas purifying catalysts in which the platinum has been sintered.

For example, Japanese patent application publication No. JP-A-2000-202309 describes a method for regenerating an exhaust gas purifying catalyst. The catalyst is made up of a carrier containing at least one element selected from alkaline earth metal oxides and rare earth element oxides, and platinum carried on the carrier. The method includes an oxidation process in which the catalyst is heated in an oxidizing atmosphere containing oxygen, and a reduction process conducted after the oxidation process. In this regeneration method, platinum oxide is formed on the surface of platinum metal particles having been sintered and grown, in the oxidation process. The platinum oxide interacts strongly with the carrier containing the specific oxide mentioned above. Thus, the platinum oxide moves from the surface of the platinum metal particles to the surface of the carrier, allowing metal platinum to appear on the surface of the platinum metal particles. The metal platinum is oxidized into platinum oxide, which in turn moves to the surface of the carrier. By repeating these events, the platinum metal particles being carried become gradually smaller in diameter and dispersed over the surface of the carrier, resulting in platinum oxide being highly dispersed over the carrier. The catalyst is then subjected to the reduction process, in which the platinum oxide is reduced to metal platinum. The activity of the catalyst can be restored by the highly dispersed metal platinum.

The above-described regeneration method includes, as the oxidation process to regenerate platinum, increasing the air-fuel (A/F) ratio of an air-fuel mixture flowing into an engine to an extremely high degree. When the above-described regeneration method is used to regenerate a catalyst incorporated in an exhaust gas purification system, however, the time when regeneration of platinum is required does not always coincide with the time when the air-fuel ratio is increased, depending on the operating conditions, making it difficult to reliably regenerate platinum.

When the concentration of oxygen is low, a sufficient amount of oxygen may not reach the downstream side of the catalyst, even if the air-fuel ratio is increased. In such a case, the regeneration process cannot be performed efficiently. Providing an air supply device on the upstream side of the catalyst is also proposed. With such an arrangement, however, it is difficult for an ordinary three-way catalyst to remove NOx in the exhaust gas with an excessive amount of oxygen supplied. As a result, NOx may unfavorably be emitted.

SUMMARY OF THE INVENTION

The present invention provides an exhaust gas purification system that regenerates the platinum and that maintains the exhaust gas purification performance even during the regeneration of the platinum.

One aspect of the present invention is directed to an exhaust gas purification system for an internal combustion engine. The exhaust gas purification system for the internal combustion engine includes: a first catalyst provided in an exhaust gas passage of the internal combustion engine, wherein platinum is carried on a carrier that contains a basic oxide; a second catalyst provided in the exhaust gas passage for removing NOx; and oxygen supply means for supplying oxygen to the first catalyst.

In the above aspect, the oxygen supply means may be provided in the exhaust gas passage upstream of the first catalyst, and the second catalyst may be provided in the exhaust gas passage downstream of the first catalyst.

In the above aspect, the oxygen supply means may be provided in the exhaust gas passage upstream of the first catalyst, and the second catalyst may be provided in the exhaust gas passage upstream of the first catalyst and the oxygen supply means.

In the above aspect, the basic oxide may be an oxide of at least one element selected from the alkaline earth metals and the rare earth elements. Alternatively, the carrier may contain a complex oxide of zirconia and/or almina and at least one element selected from the alkaline earth metals and the rare earth elements.

In the exhaust gas purification systems of the present invention, a first catalyst may be exposed to an oxidizing atmosphere by the oxygen supply means provided in the exhaust gas passage, allowing platinum having been sintered to be redispersed by oxidation/reduction. In addition, the systems are also provided with a second catalyst for removing NOx, for which reduction purification rate tends to be reduced during the supply of oxygen. The second catalyst can reduce and purify NOx even during the regeneration of the first catalyst, maintaining the exhaust gas purification performance.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF THE PREFERRED EMBODIMENTS

Figure 1:
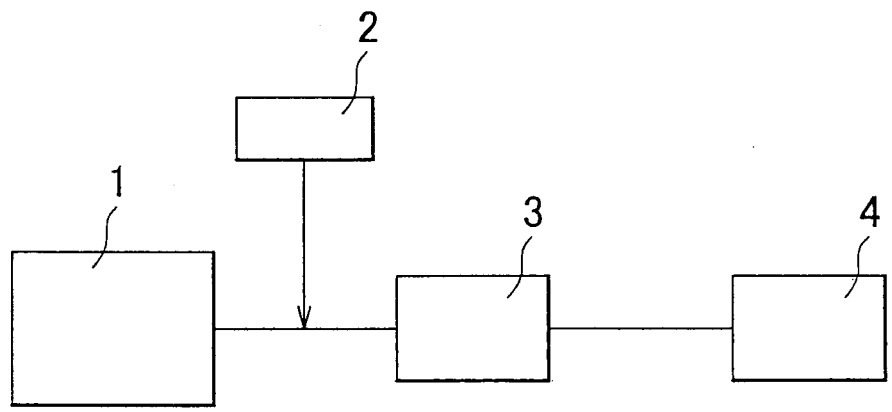
FIG. 1 is a schematic diagram of an exhaust gas purification system according to a first embodiment of the present invention.

An exhaust gas purification system according to first and second embodiments of the present invention includes: a catalyst (hereinafter referred to as "platinum-carrying catalyst") provided in an exhaust gas passage of an internal combustion engine and having a carrier containing a basic oxide and platinum carried on the carrier; a three-way catalyst or an NOx storage reduction catalyst; and oxygen supply means.

The basic oxide contained in the carrier of the platinum-carrying catalyst may be an oxide of at least one element selected from the alkaline earth metals and the rare earth elements. Alternatively, the carrier may contain a complex oxide of zirconia and/or almina and at least one element selected from the group including the alkaline earth metals, the rare earth elements and the group 3A elements.

The alkaline earth metal oxide may be an oxide of Mg, Ca, Sr, Ba and Ra of various valence numbers, and may be selected from at least one of magnesium oxide (MgO), calcium oxide (CaO) and barium oxide (BaO), which interact strongly with and hence have a high affinity to metal Pt and Pt oxide.

The rare earth oxide may be an oxide of a metal, such as Sc, Y, La, Ce, Pr, Nd, Sm, Th, Dy, Yb and Lu, of various valence numbers, and is preferably at least one kind selected from lanthanum oxide ($La_2O_3$), ceric oxide ($CeO_2$), yttrium oxide ($Y_2O_3$) and neodymium oxide ($Nd_2O_3$), which interact strongly with and hence have a high affinity to metal Pt and Pt oxide.

The complex oxide of zirconia ($ZrO_2$) and/or alumina ($Al_2O_3$) and at least one of elements selected from the group including alkali earth metals, rare earth elements and group 3A elements may be a complex oxide of zirconia and/or alumina and at least one of elements selected from the above-mentioned alkali metals Mg, Ca, Sr, Ba and Ra and the above-mentioned rare earth elements such as Sc, Y, La, Ce, Pr, Nd, Sm, Tb, Dy, Yb and Lu, and may be a complex oxide with Mg, Ca, Ba, La, Ce, Y or Nd, which interacts strongly with and hence has a high affinity to metal Pt and Pt oxide. Such complex oxides include $CeO_2$—$ZrO_2$-$Y_2O_3$, $ZrO_2$—$La_2O_3$, $CeO_2$—$ZrO_2$ and $CeO_2$—$ZrO_2$—$La_2O_3$—$Pr_2O_3$. The proportion (composite ratio) of zirconia and/or alumina to at least one of elements selected from the group including alkali earth metals, rare earth elements and group 3A elements is not specifically limited. From the viewpoint of the effect, the proportion of zirconia and/or alumina in the complex oxide may be 10 to 90 wt %, and may be 30 to 90 wt %.

The carrier of the platinum-carrying catalyst needs only to contain the above-mentioned basic oxide, even a small amount, in order to be effective. The carrier may contain 50 wt %, for example, of the basic oxide, or may be entirely composed of the basic oxide. In the case where the basic oxide is used as a part of the carrier, the rest of the carrier may be silica, alumina, zirconia, titania and silica-alumina.

The production method of the carrier is not specifically limited. For example, the method may include allowing a precipitate of the above-mentioned basic oxide to be produced from an aqueous solution containing a metal salt (for example, nitrate) as a raw material of the basic oxide, and as necessary a surface-active agent (for example, nonion surface-active agent), in the presence of ammonia, and filtering, washing, drying and then calcining the obtained precipitate.

The platinum-carrying catalyst includes at least powders in which platinum is carried on the carrier. The amount of platinum carried on the carrier may be in a range of 0.01 to 10 wt %, and may be in a range of 0.1 to 5 wt %. If the amount of platinum carried is less than the lower limit, the activity of the catalyst as an exhaust gas purifying catalyst tends to be insufficient. On the other hand, if the amount of platinum carried is more than the upper limit, the activity of the catalyst does not improve, and only increases the cost.

The method of causing platinum to be carried on the carrier is not specifically limited. For example, the method may include causing an aqueous solution containing a platinum salt (for example, dinitrodiamine salt) or a platinum complex (for example, tetraammine complex) to contact the carrier, and drying and then calcining the carrier.

The form of the platinum-carrying catalyst is not specifically limited. The platinum-carrying catalyst may be a monolithic catalyst in the form of a honeycomb, or a pellet catalyst in the form of a pellet, for example. The base is also not specifically limited, and may be selected appropriately according to the purpose of use, for example, of the catalyst to be obtained. The base may be a DPF base, a monolithic base, a pellet base and a plate-like base, for example. The material of the base is also not specifically limited. The base may be made of ceramics such as cordierite, silicone carbide and mullite, and metals such as stainless steel containing chromium and almunium. In addition, the method of producing such a catalyst is not specifically limited. For example, a monolithic catalyst may be produced by forming a coating layer of the above-mentioned carrier powders on a honeycombed base made of cordierite or a metal foil, and causing platinum to be carried on the coating layer. Another method of producing a catalyst includes first causing platinum to be carried on the above-mentioned carrier powders, and then forming a coating layer on the base using the platinum-carrying powders.

The three-way catalyst or NOx storage reduction catalyst, that is used in combination with the above platinum-carrying catalyst, may be a conventional three-way catalyst or NOx storage reduction catalyst. That is, the three-way catalyst for use in combination with the platinum-carrying catalyst may be a catalyst produced by forming a coating layer of alumina, or other materials mentioned above, on a base of cordierite, or other materials mentioned above, and causing a precious metal, such as platinum and rhodium, to be carried on the coating layer. The NOx storage reduction catalyst may be a catalyst produced by causing an alkali metal, an alkali earth metal or a rare earth element, for example, to be additionally carried on the coating layer of the three-way catalyst, on which the precious metal mentioned above is already carried.

The oxygen supply means for use in the exhaust gas purification system according to this embodiment is not specifically limited as long as it can supply oxygen or air, and may be implemented as an air valve, for example. Ambient air may be supplied directly. In order to efficiently regenerate the catalyst, air warmed beforehand using a heat exchanger mounted on an engine exhaust pipe, for example, may be supplied.

In the exhaust gas purification systems according to the embodiments of the present invention, when the platinum in the platinum-carrying catalyst is determined to have been sintered, an oxidation process and a reduction process are performed to redisperse fine platinum particles over the carrier and recover the activity of the catalyst. The carrier of the platinum-carrying catalyst for use in the exhaust gas purification systems according to the embodiments of the present invention contains a basic oxide that interacts strongly with metal platinum. Thus, the surface of platinum particles carried on the carrier have increased in size and coarsened can be oxidized easily, allowing platinum oxide to be formed easily on the surface of the coarsened platinum particles, by heating the platinum-carrying catalyst at 500 to 1000° C. in an oxidizing atmosphere containing oxygen.

Then, the platinum oxide, which has a high affinity to the carrier, moves from the surface of the coarsened platinum particles to the surface of the carrier, exposing metal platinum at the surface of the coarsened platinum particles. The exposed metal platinum is oxidized by the oxygen present in the oxidizing atmosphere to become platinum oxide, which in turn moves to the surface of the carrier. By repeating these events, the platinum particles being carried and having coarsened become gradually smaller in diameter and dispersed over the surface of the carrier as if wet, resulting in platinum oxide being highly dispersed over the carrier.

Then, a reduction process is performed, which easily reduces the platinum oxide into metal platinum. Thus, fine metal platinum particles are highly dispersed over the carrier, whereby the activity of the catalyst is recovered.

The temperature of the catalyst during the regeneration process of the platinum-carrying catalyst is initiated by an oxidation process, which includes supplying oxygen to the catalyst by means of the oxygen supply means disposed upstream of the catalyst, and heating the catalyst in an oxidizing atmosphere containing oxygen. The oxidizing atmosphere need only contain oxygen, even a small amount, that will oxidize a corresponding number of moles of platinum. The concentration of oxygen may be 1% or more by volume, or further limited to 1 to 20% by volume. Other than oxygen, the oxidizing atmosphere should contain no reducing gas, but may contain a nitrogen gas or an inert gas.

The temperature of the catalyst during the oxidation process may be any temperature at which the metal platinum carried by the catalyst is oxidized, and may be in a range of 500 to 1000° C. The duration of the oxidation process is determined according to the temperature of the oxidation process. A lower temperature requires a longer duration, and a higher temperature requires a shorter duration. In the case where the temperature of the catalyst during the oxidation process is in a range of 500 to 1000° C., the duration of the oxidation process may be between about two seconds and one hour. The catalyst may be heated by reaction heat at the catalyst. However, if the temperature of the catalyst is below the lower limit of the above-mentioned range, the catalyst may be heated by a heating means.

The reduction process may be performed by heating in the presence of a reducing gas, such as hydrogen and carbon oxide. For example, the reduction process can be performed while supplying, to the platinum-carrying catalyst, an exhaust gas in a stoichiometric atmosphere which is at a stoichiometric balance, or in a rich atmosphere where the oxygen concentration is low. In this way, the oxidation process and the reduction process can be performed on the platinum-carrying catalyst inside the exhaust gas passage, allowing the regeneration process to be performed on the catalyst as a part of the air-fuel ratio control for the engine.

The temperature of the catalyst during the reduction process may be any temperature at which the platinum oxide is reduced, and may be 200° C. or more, and may be in a range of 400 to 1000° C. The duration of the reduction process is selected appropriately according to the temperature of the reduction process. A lower catalyst temperature requires a longer duration, and a higher catalyst temperature requires a shorter duration. In the case where the temperature of the catalyst during the reduction process is 300° C. or more, the duration of the reduction process may be between about two seconds and five minutes. The catalyst may be heated by reaction heat at the catalyst. However, if the temperature of the catalyst is below the lower limit of the above-mentioned range, the catalyst may be heated by a heating means.

The platinum-carrying catalyst, which is disposed in the exhaust gas passage of the internal combustion engine, may be subjected to the regeneration process in real time as the performance of the catalyst deteriorates. The regeneration process may be performed regularly, for example according to the operating duration or the travel distance of the vehicle. Alternatively, an NOx sensor or a CO sensor may be provided downstream of the platinum-carrying catalyst to detect the performance of the catalyst, so that the regeneration process can be performed when the detected NOx and/or CO concentration exceeds a reference value.

During the regeneration process, the NOx reduction purification performance decreases under the influence of the oxidizing atmosphere in the oxidation process. However, the exhaust gas purification systems of the present invention are provided with a three-way catalyst or an NOx storage reduction catalyst in addition to the catalyst to be regenerated, and thus can prevent NOx emission, even during the regeneration.

FIG. 1 is a schematic diagram of an exhaust gas purification system according to a first embodiment of the present invention. This exhaust gas purification system includes oxygen supply means 2, a platinum-carrying catalyst 3 and an NOx storage reduction catalyst 4, which are disposed in the stated order from the upstream side of an exhaust gas passage from an internal combustion engine 1. When it is determined that the platinum-carrying catalyst 3 has deteriorated, the oxygen supply means 2 supplies oxygen to the platinum-carrying catalyst 3 to regenerate the platinum-carrying catalyst 3. During the regeneration, NOx emitted from the platinum-carrying catalyst 3 is purified by the NOx storage reduction catalyst 4, which is disposed in the exhaust gas passage downstream of the platinum-carrying catalyst 3. HC and CO in the exhaust gas are removed by the platinum-carrying catalyst 3 and the NOx storage reduction catalyst 4, when oxygen is supplied.

Figure 2:
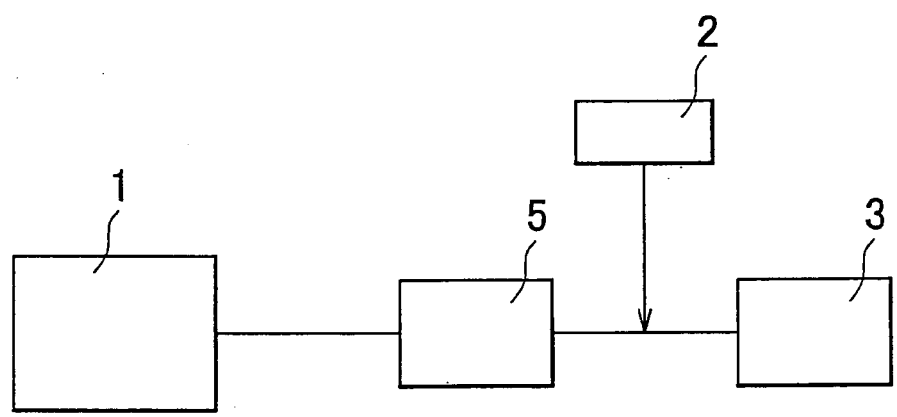
FIG. 2 is a schematic diagram of an exhaust gas purification system according to a second embodiment of the present invention.

FIG. 2 is a schematic diagram of an exhaust gas purification system according to a second embodiment of the present invention. This exhaust gas purification system includes a three-way catalyst 5, oxygen supply means 2 and a platinum-carrying catalyst 3, which are disposed in this order from the upstream side of an exhaust gas passage from an internal combustion engine 1. When it is determined that the platinum-carrying catalyst 3 has deteriorated, the oxygen supply means 2 supplies oxygen to the platinum-carrying catalyst 3 to regenerate the platinum-carrying catalyst 3. During the regeneration of the platinum-carrying catalyst 3, no NOx is emitted from the platinum-carrying catalyst 3, because exhaust gas flowing into the platinum-carrying catalyst 3 is already reduced and purified by the three-way catalyst 5, which is disposed in the exhaust gas passage upstream of the platinum-carrying catalyst 3. HC and CO in the exhaust gas are removed by the platinum-carrying catalyst 3 and the three-way catalyst 5 provided upstream of the platinum-carrying catalyst 3, when oxygen is supplied.

Figure 3:
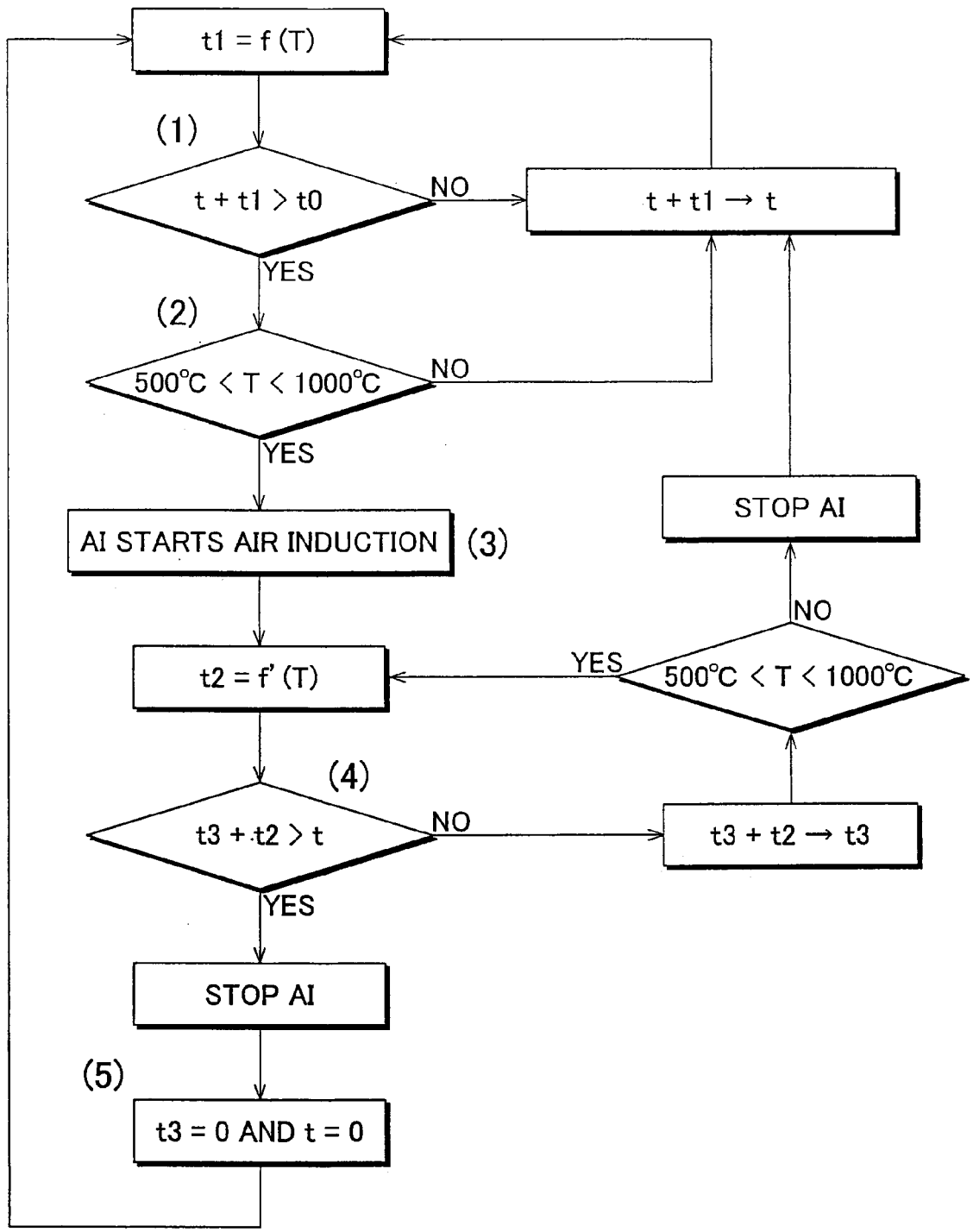
FIG. 3 is a flowchart of a process of controlling the regeneration of a catalyst in the exhaust gas purification systems according to the first and second embodiments of the present invention.

FIG. 3 shows a routine of a process of controlling the regeneration of a catalyst in the exhaust gas purification systems according to the first and second embodiments of the present invention. In this regeneration control, the oxygen supply means (AI) 2 is controlled based on the degree of deterioration (accumulated deterioration time) of the platinum-carrying catalyst 3 derived from the temperature of the platinum-carrying catalyst 3, as described below. In FIG. 3, "T" represents the temperature of the platinum-carrying catalyst 3 detected by a temperature sensor provided to the platinum-carrying catalyst 3; "f(T)" is a map for converting the temperature of the platinum-carrying catalyst 3 into the deterioration time; "t" represents the accumulated deterioration time; "t1" represents the deterioration temperature time; "to" represents the regeneration starting time; "f'(T)" is a map for converting the temperature of the catalyst 3 into the regeneration time; "t2" represents the regeneration temperature time; and "t3" represents the accumulated regeneration time.

(1) An ECU for controlling the oxygen supply means (AI) 2 records the accumulated deterioration time (t) of the platinum-carrying catalyst 3 using the temperature (T) of the platinum-carrying catalyst 3 detected by the temperature sensor provided to the platinum-carrying catalyst 3 and the prescribed map (f(T)) defining the deterioration of the platinum-carrying catalyst 3.

(2) The ECU predicts the current degree of deterioration of the platinum-carrying catalyst 3 (diameter of platinum particles) based on the accumulated deterioration time (t) of the platinum-carrying catalyst 3 and the deterioration temperature time (t1) derived from the map defining the deterioration of the platinum-carrying catalyst 3, and when platinum of the platinum-carrying catalyst 3 is determined to have been sintered (t+t1>t0), sends an air induction signal to the oxygen supply means (AI) 2.

(3) The platinum is regenerated (redispersed) when the temperature is in a range of 500 to 1000° C., but regeneration of the platinum is insufficient outside of this range. Thus, when the platinum-carrying catalyst 3 reaches the temperature range of 500 to 1000° C., where the catalyst can be regenerated, after the air induction signal is sent in the step (2) above, the oxygen supply means (AI) 2 inducts air to regenerate the platinum-carrying catalyst 3. When the platinum-carrying catalyst 3 is not in the temperature range, air is not inducted and the process returns to the step (1) above.

(4) The oxygen supply means (AI) 2 continues inducting air in the step (3) above, until the platinum-carrying catalyst 3 is determined to have been regenerated sufficiently, based on the degree of deterioration of the platinum-carrying catalyst 3 predicted based on the accumulated regeneration time (t3) of the platinum-carrying catalyst 3 and the regeneration temperature time (t2) derived from the prescribed map (f'(t)) defining the regeneration of the platinum-carrying catalyst 3 (redispersion of platinum). When the temperature of the platinum-carrying catalyst 3 has come out of the range of 500 to 1000° C., the oxygen supply means (AI) 2 stops inducting air and the process returns to the step (1) above. The above-mentioned ECU determines that the platinum-carrying catalyst 3 is sufficiently regenerated when the sum of the accumulated regeneration time (t3) and the regeneration temperature time (t2) mentioned above is at least equal to the above-mentioned accumulated deterioration time (t).

(5) After the regeneration of the catalyst is determined to have finished in the step (4) above, the oxygen supply means (AI) 2 stops inducting air and the process starts over again from the step (1) above, allowing reliable regeneration of platinum and maintaining the exhaust gas purification performance.

In the above-described routine, the temperature sensor may be replaced with an oxygen sensor for detecting the degree of deterioration in oxygen storage performance of the platinum-carrying catalyst 3, in order to determine the degree of deterioration of the catalyst and send an air induction signal for the purpose of regeneration.

EXAMPLE 1

A honeycombed base made of cordierite was coated with $CeO_2$—$ZrO_2$ complex oxide (with a molar ratio of Ce/Zr=6/4) carrying 1 wt % of platinum at a coating concentration of 120 g/L, and dried at 250° C. After dried, the base was calcined at 600° C. for one hour to obtain a platinum-carrying catalyst. The catalyst was exposed to 3% of $CO/N_2$ at a flow rate of 15 L/min at 950° C. for five hours to obtain a durable platinum-carrying catalyst. A part of the coating layer of the durable catalyst was sampled, and subjected to the CO chemisorption method described in JP-A-2005-164391 to obtain the average diameter of platinum particles, which was 9 nm.

Meanwhile, a honeycombed base made of cordierite was coated with alumina at a coating concentration of 120 g/L. The obtained honeycombed carrier was immersed in a dinitrodiamine platinum aqueous solution at a concentration where platinum is present at a concentration of 2 g/L, and dried at 250° C. After that, the platinum-carrying carrier was immersed in a barium acetate aqueous solution at a concentration where Ba is present at a concentration of 0.3 mol/L, dried, and calcined at 600° C. for one hour to obtain an NOx storage reduction catalyst.

An air valve, the durable platinum-carrying catalyst described above and the NOx storage reduction catalyst described above were disposed on an exhaust pipe from a 3.0-L gasoline engine as shown in FIG. 1.

EXAMPLE 2

A honeycombed base made of cordierite was coated with alumina at a coating concentration of 120 g/L. The obtained honeycombed carrier was immersed in a dinitrodiamine platinum aqueous solution at a concentration so prescribed as to carry platinum at 2 g/L, and dried at 250° C. After drying, the base was calcined at 600° C. for one hour to obtain a three-way catalyst.

The three-way catalyst, air valve and durable platinum-carrying catalyst described above were disposed on an exhaust pipe from a 3.0-L gasoline engine as shown in FIG. 2.

COMPARATIVE EXAMPLE 1

An air valve and the durable platinum-carrying catalyst described above, but no NOx storage reduction catalyst, were disposed in this order in an exhaust pipe from a 3.0-L gasoline engine.

COMPARATIVE EXAMPLE 2

The durable platinum-carrying catalyst described above and the NOx storage reduction catalyst described above, but not an air valve, were disposed on an exhaust pipe from a 3.0-L gasoline engine.

Catalyst Regeneration Test

The engine was operated at an approximately stoichiometric ratio for five hours such that the catalyst bed temperature of the platinum-carrying catalyst is at 700° C. in the above-described exhaust gas purification system. During the operation, air was inducted via the air valve for two minutes at intervals of ten minutes. After this five-hour test, a part of the coating layer of the platinum-carrying catalyst was sampled, and subjected to the same CO chemisorption method as mentioned above to obtain the average diameter of platinum particles. The NOx purification rate during the operation of five hours was obtained by comparing the amount of NOx emission when using a catalyst to that when using no catalyst (that is, Comparative Example 1). In Comparative Example 2, air was not inducted during the regeneration test. The test results are shown in Table 1 below.

TABLE 1

| | Platinum particle diameter before regeneration test | Platinum particle diameter after regeneration test | NOx purification rate during test |
|---|---|---|---|
| Example 1 | 9 nm | 4 nm | 98% |
| Example 2 | 9 nm | 4 nm | 95% |
| Comparative Example 1 | 9 nm | 4 nm | 66% |
| Comparative Example 2 | 9 nm | 9 nm | 75% |

As shown in the table, the exhaust gas purification systems according to the embodiments of the present invention allows regeneration of catalysts without reducing the NOx purification rate.

While the invention has been described with reference to example embodiments thereof, it is to be understood that the invention is not limited to the example embodiments or constructions. To the contrary, the invention is intended to cover various modifications and equivalent arrangements. In addition, while the various elements of the example embodiments are shown in various example combinations and configurations, other combinations and configurations, including more, less or only a single element, are also within the spirit and scope of the invention.

The invention claimed is:

1. An exhaust gas purification system for an internal combustion engine, comprising:
   a first catalyst provided in an exhaust gas passage of the internal combustion engine, wherein platinum is carried on a carrier that contains a basic oxide;
   a second catalyst provided in the exhaust gas passage for purifying NOx;
   a controller configured to judge necessity to regenerate the platinum in the first catalyst; and
   an oxygen supply device configured to supply oxygen to the first catalyst when the controller judges the necessity;
   wherein the controller is configured to record an accumulated deterioration time of the first catalyst using a temperature of the first catalyst and to judge necessity to regenerate the platinum in the first catalyst based on the accumulated deterioration time.

2. The exhaust gas purification system according to claim 1, wherein:
   the oxygen supply device is provided in the exhaust gas passage upstream of the first catalyst; and
   the second catalyst is provided in the exhaust gas passage downstream of the first catalyst.

3. The exhaust gas purification system according to claim 1, wherein:
   the oxygen supply device is provided in the exhaust gas passage upstream of the first catalyst; and
   the second catalyst is provided in the exhaust gas passage upstream of the first catalyst and the oxygen supply device.

4. The exhaust gas purification system according to claim 1, wherein the basic oxide is an oxide of at least one of elements selected from alkaline earth metals and rare earth elements, or is a complex oxide of zirconia and/or alumina and at least one of elements selected from alkaline earth metals and rare earth elements.

5. The exhaust gas purification system according to claim 1, wherein the oxygen supply device is provided in the exhaust gas passage upstream of the first catalyst.

6. The exhaust gas purification system according to claim 1, wherein the second catalyst is a three-way catalyst.

7. The exhaust gas purification system according to claim 1, wherein the second catalyst is an NOx storage reduction catalyst.

8. The exhaust gas purification system according to claim 1, further comprising an oxygen sensor that is provided in the exhaust gas passage downstream of the first catalyst, and that detects an oxygen concentration in an exhaust gas downstream of the first catalyst, wherein
   the oxygen supply device determines deterioration of the first catalyst based on the oxygen concentration detected by the oxygen sensor.

9. The exhaust gas purification system according to claim 1, further comprising a temperature sensor that detects the temperature of the first catalyst, wherein
   the oxygen supply device supplies oxygen to the first catalyst when the first catalyst is determined to have deteriorated and the detected temperature of the first catalyst is in a range of 500° C. to 1000° C.

10. The exhaust gas purification system according to claim 1, wherein the oxygen supply device supplies oxygen to the first catalyst when a duration of operation of the internal combustion engine has reached a prescribed time.

11. The exhaust gas purification system according to claim 1, wherein an amount of the basic oxide contained in the carrier is 50 wt % or more.

* * * * *